(12) United States Patent
Iwasaki et al.

(10) Patent No.: US 10,776,221 B2
(45) Date of Patent: *Sep. 15, 2020

(54) AVOIDING INODE NUMBER CONFLICT DURING METADATA RESTORATION

(71) Applicant: International Business Machines Corporation, Armonk, NY (US)

(72) Inventors: Norie Iwasaki, Fujisawa (JP); Sosuke Matsui, Higashimurayama (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/941,053

(22) Filed: Mar. 30, 2018

(65) Prior Publication Data
US 2018/0225181 A1    Aug. 9, 2018

Related U.S. Application Data

(63) Continuation of application No. 14/926,218, filed on Oct. 29, 2015, now Pat. No. 9,965,361.

(51) Int. Cl.
*G06F 16/23* (2019.01)
*G06F 11/14* (2006.01)
(Continued)

(52) U.S. Cl.
CPC ........ *G06F 11/1469* (2013.01); *G06F 16/183* (2019.01); *G06F 16/2365* (2019.01); *G06F 16/958* (2019.01); *G06F 2201/84* (2013.01)

(58) Field of Classification Search
CPC .................................................. G06F 16/2365
See application file for complete search history.

(56) References Cited

U.S. PATENT DOCUMENTS

| 5,513,314 A | 4/1996 | Kandasamy et al. |
| 7,783,611 B1 | 8/2010 | Hamilton et al. |
| (Continued) | | |

FOREIGN PATENT DOCUMENTS

WO    2013171805 A1    11/2013

OTHER PUBLICATIONS

"Backing Up and Restoring a File System", http://wiki.old.lustre.org/manual/LustreManual20_HTML/BackupAndRestore.html., 2011, pp. 1-7.

(Continued)

*Primary Examiner* — Kris E Mackes
(74) *Attorney, Agent, or Firm* — Reza Sarbakhsh

(57) ABSTRACT

A method for avoiding inode number conflict during metadata restoration at a restoration location is provided. The method includes receiving metadata for a first file including an inode containing an initial internal inode number and a directory entry containing an external inode number, determining an allocation status of the initial internal inode number at the restoration location, identifying an available internal inode number to be allocated to the first file, updating the initial internal inode number in the inode for the first file with the available internal inode number, registering the available internal inode number and the external inode number in an inode mapping table indicating correspondence between the available internal inode number and the external inode number, and restoring the inode based on the available internal inode number.

20 Claims, 10 Drawing Sheets

(51) Int. Cl.
*G06F 16/182* (2019.01)
*G06F 16/958* (2019.01)

(56) References Cited

U.S. PATENT DOCUMENTS

| | | |
|---|---|---|
| 8,977,598 B2 | 3/2015 | Montulli et al. |
| 9,002,911 B2 | 4/2015 | Anderson et al. |
| 9,594,763 B2 | 3/2017 | Lord |
| 2003/0191745 A1 | 10/2003 | Jiang et al. |
| 2005/0234867 A1 | 10/2005 | Shinkai |
| 2007/0055702 A1 | 3/2007 | Fridella et al. |
| 2008/0189342 A1 | 8/2008 | Bhattacharya et al. |
| 2010/0057755 A1 | 3/2010 | Schneider |
| 2011/0016085 A1 | 1/2011 | Kuo et al. |
| 2011/0282917 A1 | 11/2011 | Desai et al. |
| 2012/0066182 A1 | 3/2012 | Chang et al. |
| 2013/0138615 A1 | 5/2013 | Gupta et al. |
| 2013/0268493 A1 | 10/2013 | Berman et al. |
| 2013/0275653 A1 | 10/2013 | Ranade et al. |
| 2014/0081979 A1 | 3/2014 | Pn |
| 2016/0259801 A1 | 9/2016 | Lee et al. |
| 2017/0123937 A1 | 5/2017 | Iwasaki et al. |

OTHER PUBLICATIONS

"Gmail Back Soon for Everyone", http://gmailblog.blogspot.jp/2011/02/gmail-back-soon-for-everyone.html, dated Mar. 2, 2011, 1 page.

Translation of Sugaya, "Linux tile system technology commentary (1): VFS and file system of the basic technology (2/2)," http://www.atmarkit.co.jp/ait/articles/0305/20/news002_2.html, dated May 20, 2003, 11 pages.

Mell et al., "The NIST Definition of Cloud Computing", National Institute of Standards and Technology, Special Publication 800-145, Sep. 2011, pp. 1-7.

IBM: List of IBM Patents or Patent Applications Treated as Related (Appendix P), Mar. 30, 2018, pp. 1-2.

AVOIDING INODE NUMBER CONFLICT DURING METADATA RESTORATION

BACKGROUND

The present invention generally relates to generating, backing up and restoring data, and more particularly to avoiding inode number conflict during metadata restoration.

In a hierarchical data storage system, data backup may include pre-migration of data to a backup medium (e.g., continuous copying of data from a disk to a tape). Metadata associated with the data may also be copied and used for restoration of the backed up data. Metadata may include information about a data file or directory, such as time and date of creation, creator/owner, file size, file tree information, etc. Certain metadata (e.g., owner of the file (UID), file size, etc.) for a file may be stored in a structure called an inode. Each inode may be assigned an ID called an inode number. Typically, each inode number is unique to the file system or partition containing the inode. The contents of the data file or directory associated with the inode may be stored elsewhere on a disk. In the case of data files physically stored on a backup tape, a table (e.g., a file-tape mapping table) may include inode numbers and the locations on the backup tape for the data files corresponding to the inode numbers. A directory entry may list inode numbers and corresponding filenames.

In one example of file restoration, backup tapes containing backed up data may be brought to a secondary site for restoration. In another example of file restoration, metadata associated with the backed up data (e.g., file tree information) may initially be written from a backup tape to a disk at the secondary site and, subsequently, backed up data (e.g., files) may be written from the tape to the disk when the backed up data is accessed/requested. In such examples, the inodes for the backed up data may be restored first and then the associated data may be written from the backup tapes (or other media) when needed.

In one example, a file system associated with a first location (e.g., a primary site) may assign inode numbers independently from a second file system associated with a second location (e.g., a disaster recovery site). A first file generated at the first location may be assigned an inode number that conflicts with the inode number assigned to a second file at the second location. Restoration of the inode associated with the first file may not occur at the second location because the inode number for the first file has already been allocated at the second location.

SUMMARY

According to one embodiment, a method for avoiding inode number conflict during metadata restoration at a restoration location is provided. The method may include receiving metadata associated with a first file generated at another location including an inode containing an initial internal inode number and a directory entry containing an external inode number, determining an allocation status of the initial internal inode number at the restoration location, identifying, based on the allocation status of the initial internal inode number being allocated to another file at the restoration location, an available internal inode number to be allocated to the first file, updating the initial internal inode number in the inode with the first file with the available internal inode number, registering the available internal inode number and the external inode number in an inode mapping table indicating correspondence between the available internal inode number and the external inode number, and restoring the inode based on the available internal inode number.

According to another embodiment, a computer program product for avoiding inode number conflict during metadata restoration at a restoration location is provided. The computer program product may include at least one computer readable non-transitory storage medium having computer readable program instructions for execution by a processor. The computer readable program instructions may include instructions for receiving metadata for a first file including an inode containing an initial internal inode number and a directory entry containing an external inode number, determining an allocation status of the initial internal inode number at the restoration location, identifying an available internal inode number to be allocated to the first file, updating the initial internal inode number in the inode for the first file with the available internal inode number, registering the available internal inode number and the external inode number in an inode mapping table indicating correspondence between the available internal inode number and the external inode number, and restoring the inode based on the available internal inode number.

According to another embodiment, a computer system for avoiding inode number conflict during metadata restoration at a restoration location is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions may include instructions for receiving metadata for a first file including an inode containing an initial internal inode number and a directory entry containing an external inode number, determining an allocation status of the initial internal inode number at the restoration location, identifying an available internal inode number to be allocated to the first file, updating the initial internal inode number in the inode for the first file with the available internal inode number, registering the available internal inode number and the external inode number in an inode mapping table indicating correspondence between the available internal inode number and the external inode number, and restoring the inode based on the available internal inode number.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-10, like numerals being used for like and corresponding parts of the various drawings.

According to one embodiment, provided is a method for avoiding inode number conflict during metadata restoration at a restoration location by receiving metadata including an initial internal inode number and an external inode number associated with a first file generated at another location, determining that a conflict may exist between the initial internal inode number and an internal inode number already allocated to a file at the restoration location, updating the initial internal inode number with an available internal inode number, registering correspondence between the available internal inode number and the external inode number, and restoring the inode based on the available internal inode number. The initial internal inode number may be written in an inode associated with the first file and the external inode number may be written in a directory entry associated with the first file. After the inode is restored, the directory entry may be restored.

The methods, computer program products, and systems disclosed herein may avoid inode number conflict during metadata restoration at a restoration location by introducing internal and external inode numbers associated with the files to be restored. The internal inode numbers may be unique to a file system and the external inode numbers may be unique to a fileset to which a particular file belongs. At the time of restoration, the internal inode number may be updated, while the external inode number may remain unchanged, which may enhance the efficiency of avoiding inode number confliction by obviating the need to update multiple types of entries in the metadata (e.g., directory entries, entries in file-tape mapping tables, etc.).

Figure 1:
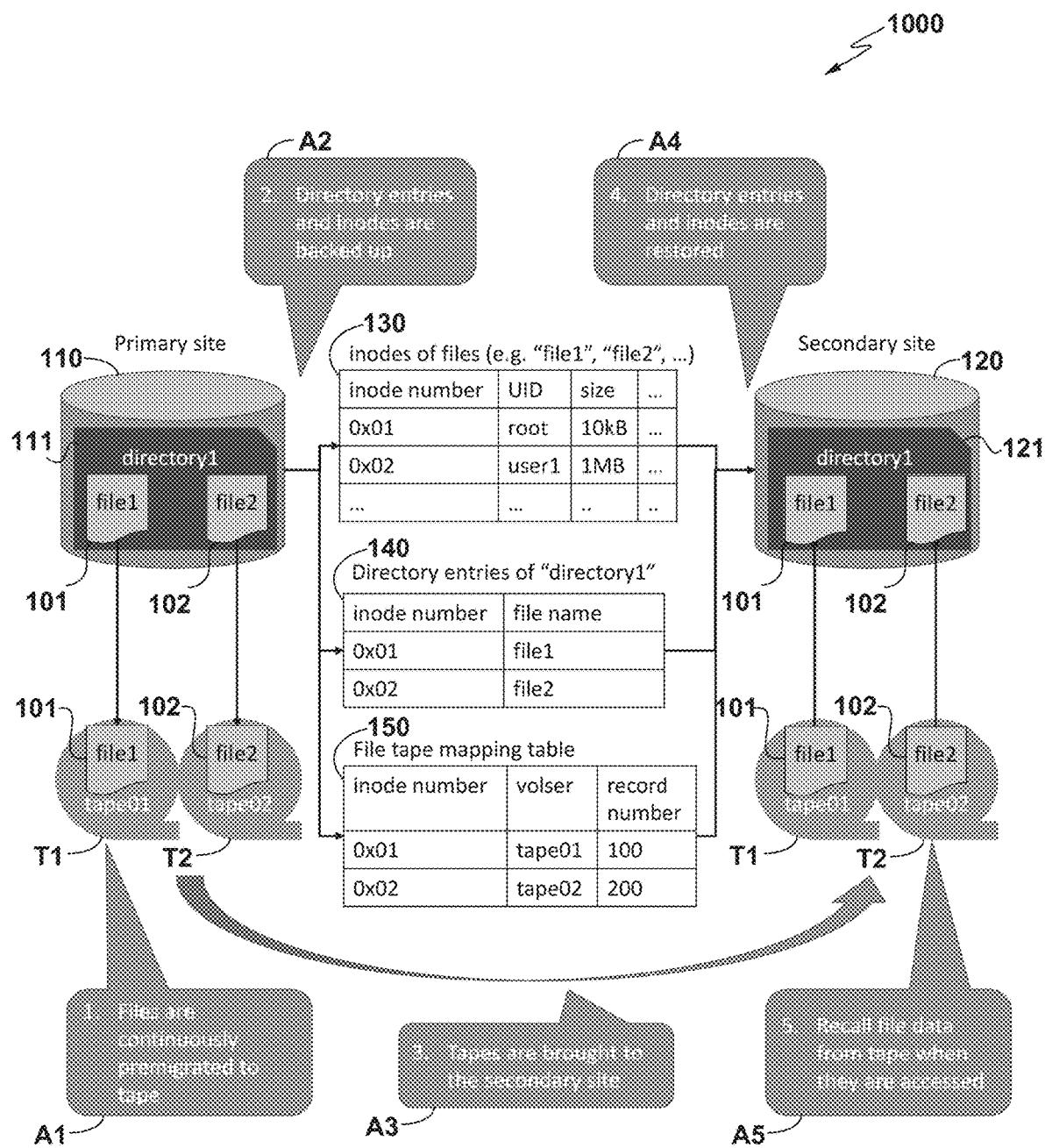
FIG. 1 is a block diagram illustrating a method of data backup at a first site and data restoration at a second site.

FIG. 1 depicts an exemplary system 1000 illustrating a method of restoring data stored in a hierarchical fashion (e.g., disk and backup tapes) at a first site and restored at another site (including metadata restoration). Primary site 110 (e.g., an operational site) may include data stored on disks that are backed up to tape, e.g., continuously. Primary site 110 may include a primary site directory 111 containing data files (e.g., a first data file 101 and a second data file 102).

At A1, data (e.g., first data file 101 and second data file 102) from the primary site directory 111 may be continuously copied (i.e., pre-migrated) to backup media (e.g., a first tape T1 and a second tape T2). These data may be considered effectively backed up because the data has been copied to a backup medium. The file system may be considered backed up when file tree information for the file system (e.g., inodes and directory entries) is copied, e.g., to the backup medium.

At A2, metadata for the backed up files (e.g., first data file 101 and second data file 102) may be written to the backup medium. The metadata may include inodes 130 of the files, which may include the inode number associated with the data files, the owner of the file (UID), the file size, a fileset identifier, etc. In this example, two inode numbers are listed as 0x01 and 0x02. The metadata may also include directory entry table 140 and a file-tape mapping table 150. The directory entry table 140 is an exemplary table for managing combinations of inode numbers and filenames associated with data files stored in a particular directory (e.g., primary site directory 111), and may include one or more directory entries. The file-tape mapping table 150 is an exemplary file-tape correspondence table for managing data files and the position of the data file in the backup medium, e.g., tape volume serial number (or volser), record number on the tape, etc. A file-tape correspondence table (e.g., file-tape mapping table 150) may be managed by software, such as Tivoli® Storage Manager (TSM) or Linear Tape File System Enterprise Edition™ (LTFS EE).

At A3, the backup media (e.g., tapes T1 and T2) may be brought to a secondary site 120 (e.g., a disaster recovery site).

At A4, metadata associated with the backed up data may be restored. In one example, file tree information for the backed up data is written from the backup media to the disk at the secondary site 120. In one example, the inodes 130, the directory entry table 140, and the file-tape mapping table 150 may be written from the backup media to the secondary site 120. Restoration of metadata may be separate from restoration of data files associated with the metadata. For example, at a time associated with data restoration, metadata may be initially restored and the data files associated with the metadata may remain on the backup media awaiting restoration, e.g., at a time associated with accessing or requesting the data files.

At A5, the data files associated with the metadata may be written to a disk at the secondary site 120. For example, first data file 101 and second data file 102 may be written to a secondary directory 121 (which may be a restoration of the primary site directory 111). In one example, metadata (e.g., file tree information, inodes, etc.) has previously been restored and written to a disk on secondary site 120, and in response to a recall/request to access data files from the backup media, the data files are written to the disk on secondary site 120. Restoration of the backed up data file may include receiving a request to access the backed up data file, e.g., by filename and/or path, and in response to the request, the inode number for the backed up data file may be obtained, e.g., from the directory entry table 140. The location of the backed up data file on the backup medium may be obtained, e.g., from the file-tape mapping table 150, using the inode number for the backed up data file.

Metadata backup restoration, as described above, may provide improved efficiency compared to conventional methods of data file backup restoration. With respect to metadata restoration, the time necessary to perform a file system backup restoration may be proportional to the amount of files in the file system because a file system backup restoration includes restoration of the metadata for all the files in the file system.

The efficiency of metadata backup restoration may be improved by performing restoration on a fileset by fileset basis. A fileset is a sub-tree below a directory in a file system. File systems such as General Parallel File System (GPFS™) or Journaling File System (JFS) support the creation of filesets. Metadata backup restoration on a fileset by fileset basis may enhance efficiency by excluding unnecessary files (and associated metadata) from the groups of files (e.g., filesets) to be backed up/restored. A fileset identifier may be included in the metadata, e.g., in the inodes for the files within the fileset. In addition, the frequency of backing up each fileset may be changed according to the importance of the files within each fileset.

It will be appreciated that FIG. 1 may depict a restoration of a file system at primary site 110 (e.g., containing primary site directory 111, first data file 101, and second data file 102) at secondary site 120. It will also be appreciated that primary site directory 111 (and first data file 101 and second data file 102) may represent a first fileset and secondary directory 121, which may be a restoration of the primary site directory 111, may represent a restoration of the first fileset.

Figure 2:
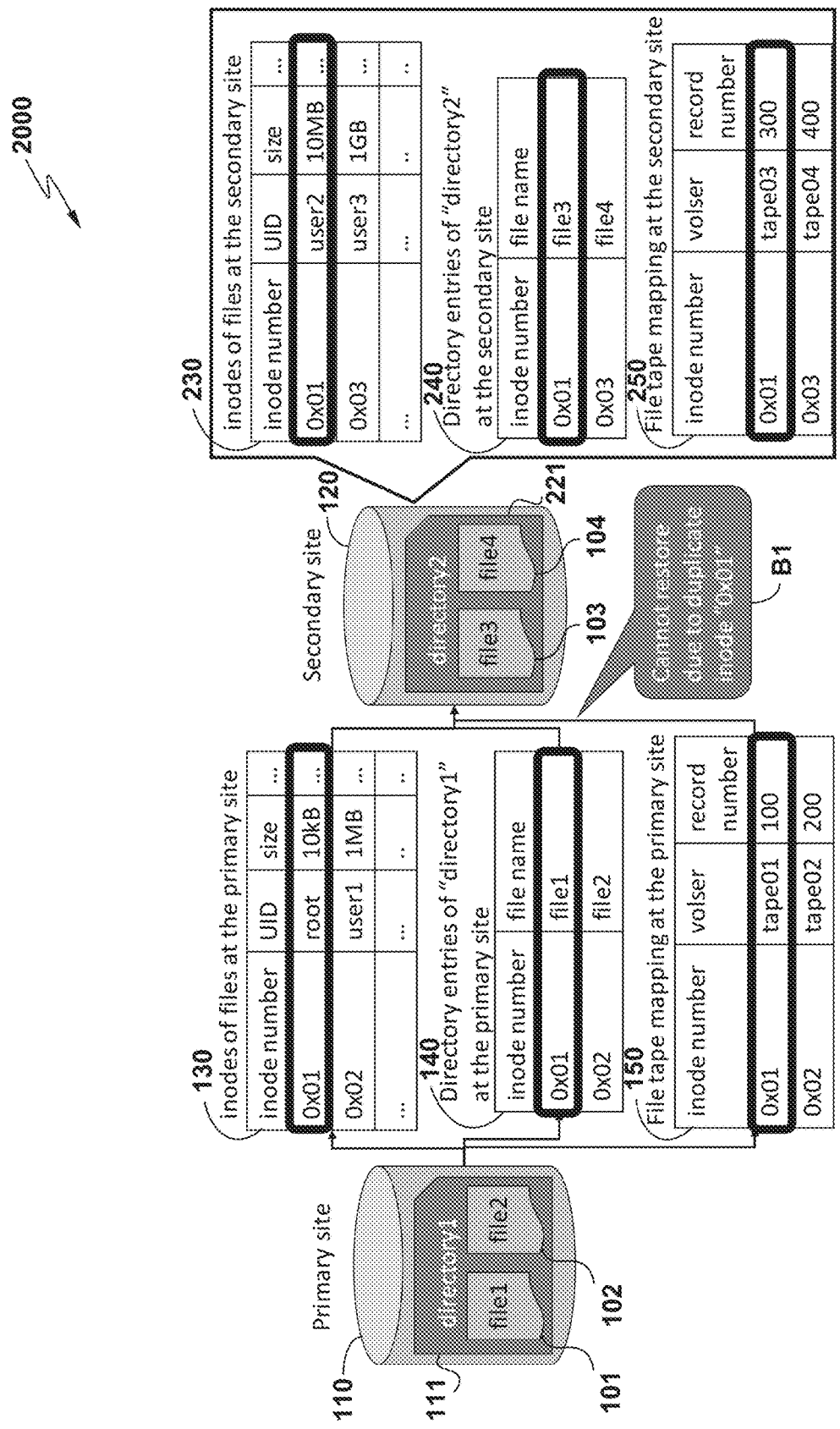
FIG. 2 is a block diagram illustrating a conflict between metadata at a first site and metadata at a second site.

FIG. 2 depicts an exemplary system 2000 illustrating an exemplary conflict between metadata for data generated at a first site and metadata for data generated (or stored) at a second site (e.g., a restoration site). Exemplary system 2000 may include primary site 110 (e.g., an operational site) with a primary site directory 111 containing data files (e.g., a first data file 101 and a second data file 102), as depicted in FIG. 1. However, in contrast to exemplary system 1000, exemplary system 2000 may contain pre-existing files at secondary site 120 (e.g., a third data file 103 and a fourth data file 104). These pre-existing files may be present at secondary site 120 at the time of metadata restoration.

As with exemplary system 1000 (depicted in FIG. 1), data from primary site directory 111 may be copied to backup media (not shown in FIG. 2), the backup media may be transported to secondary site 120 for restoration. Metadata restoration may include restoring inodes for the data files to be restored. However, file systems at separate locations (e.g., a file system in a primary site 110 and a file system in a secondary site 120) may independently assign inode numbers for files generated at each location. This may lead to one file system assigning an inode number to a file at the first location that is the same as another file at another location.

For example, secondary site 120 may have pre-existing files (e.g., third data file 103 and fourth data file 104) stored in a pre-existing directory (e.g., second directory 221) that is separate from the directory and files that have been generated at primary site 110. A file system at secondary site 120 may have assigned an exemplary inode number "0x01" to third data file 103, which may be written in second inodes 230, second directory entry table 240, and second file-tape mapping table 250. However, the exemplary inode number "0x01" may also be assigned to first data file 101 (by a file system at primary site 110).

At B1 (at the time of metadata restoration), the inode for first data file 101 cannot be restored by the file system at secondary site 120 because the inode number for first data file 101 is already allocated to a file at secondary site 120 (i.e., third data file 103).

It will be appreciated that primary site directory 111 and second directory 221 may be directories in separate filesets. It will further be appreciated that the file system at secondary site 120 may support the creation (and restoration) of filesets; however, all the inode numbers on the file system at secondary site 120 may be unique (within the file system).

Figure 3:
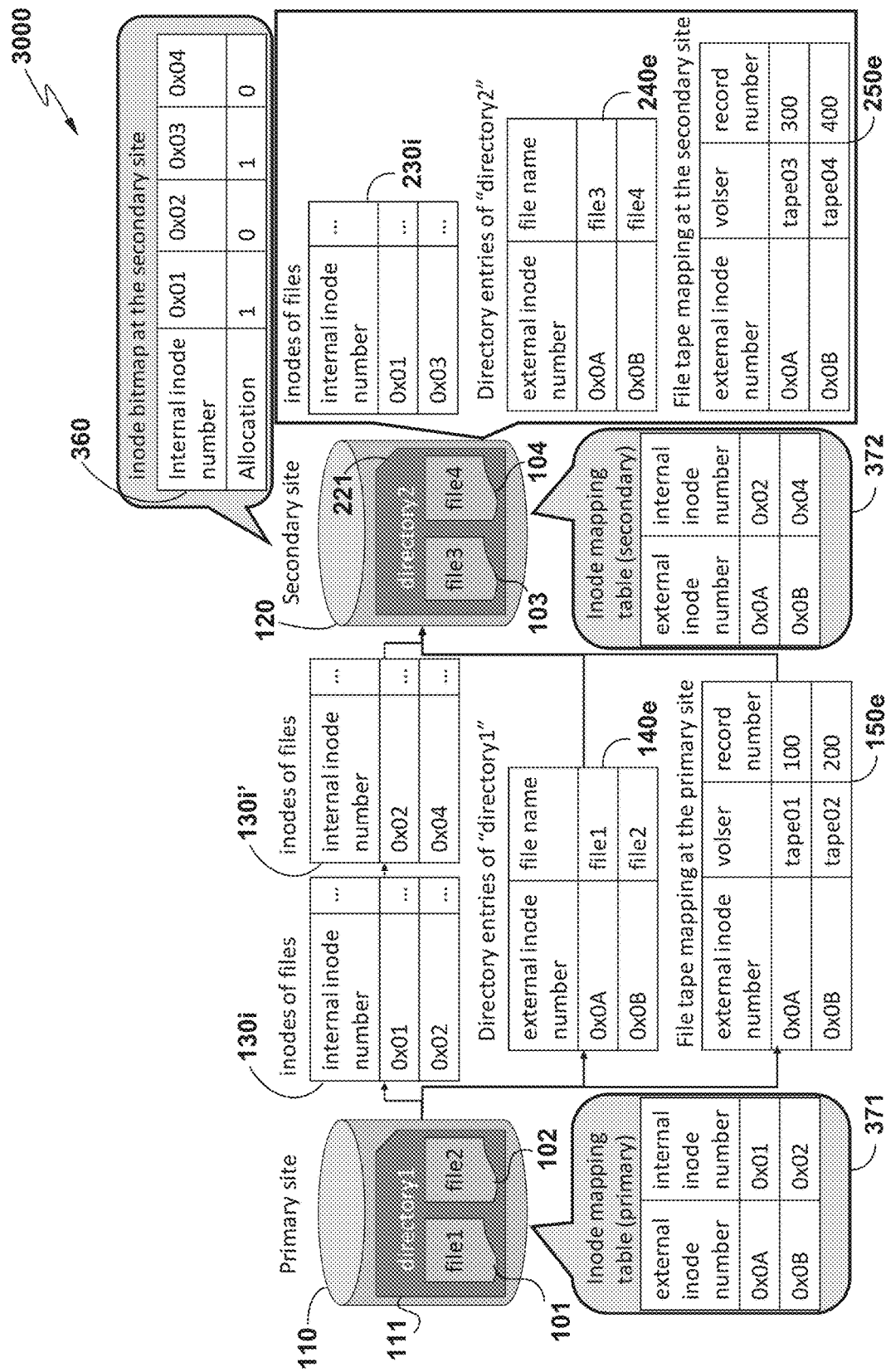
FIG. 3 is a block diagram illustrating a method of avoiding inode number conflict during metadata restoration, according to an embodiment.

FIG. 3 depicts an exemplary system 3000 illustrating a method of avoiding inode number conflict during metadata restoration, according to an embodiment. Exemplary system 3000 may include primary site 110 (e.g., an operational site) with a primary site directory 111 containing data files (e.g., first data file 101 and second data file 102), as depicted in FIGS. 1 and 2, and secondary site 120 (e.g., a disaster recovery site) with a second directory 221 containing other files (e.g., third data file 103 and fourth data file 104), as depicted in FIG. 2. However, in contrast to exemplary systems 1000 and 2000, exemplary system 3000 may include internal and external inode numbers associated with data generated at primary site 110 and data generated at secondary site 120.

Exemplary system 3000 may also include an internal inode number allocation table at the secondary site 120 (e.g., inode bitmap 360) indicating an allocation status of internal inode numbers at the secondary site 120. The internal inode number allocation table (e.g., inode bitmap 360) may be a data structure that expresses the state of use of internal inode numbers in a bit sequence, e.g., when an inode number is in use an associated bit may be set to "1". In one embodiment, inode bitmap 360 may indicate the allocation status of internal inode numbers within a file system at secondary site 120.

Primary site 110 and secondary site 120 may also include inode mapping tables (e.g., primary inode mapping table 371 and secondary inode mapping table 372), which may provide correspondence between the internal and external inode numbers for the files, e.g., in primary site directory 111 and second directory 221, respectively.

Primary site directory 111 and second directory 221 may be directories in separate filesets. It will be appreciated that, in this exemplary illustration, after metadata from primary site 110 is restored at secondary site 120, secondary site 120 may contain metadata for multiple filesets (e.g., a first fileset containing first data file 101 and second data file 102 and a second fileset containing third data file 103 and fourth data file 104).

The internal inode numbers may be written in the inodes for the files or directories. The internal inode numbers may be unique to the file system associated with the files or directories. The external inode numbers may be written in the directory entries for the files, and the file-tape mapping table associated with the files. In contrast to the internal inode numbers, the external inode numbers may be unique to the fileset associated with the files or directories. It is contemplated that a file system may contain unique internal inode numbers and duplicate external inode numbers, as long as the external inode numbers are unique within each fileset in the file system.

In accordance with the methods disclosed herein, the internal inode numbers may be updated. In one embodiment, the internal inode numbers associated with backed up files may be updated at the time of metadata restoration and the external inode numbers associated with the backed up files may remain unchanged at the time of metadata restoration (as well as at the time of file retrieval).

Primary inodes 130i may contain internal inode numbers for data generated at primary site 110 (e.g., 0x01, 0x02). Primary site directory entry table 140e and primary file-tape mapping table 150e may contain external inode numbers for the data generated at primary site 110 (e.g., 0x0A, 0x0B).

Secondary inodes 230i may contain internal inode numbers for data stored at secondary site 120 (e.g., 0x01, 0x03).

Secondary directory entry table 240e and secondary file-tape mapping table 250e may contain external inode numbers for the data stored at secondary site 120 (e.g., 0x0A, 0x0B). It will be appreciated that secondary directory entry table 240e (and secondary file-tape mapping table 250e) may be associated with second directory 221 (e.g., as a fileset). It will further be appreciated that additional directories (e.g., additional filesets) at secondary site 120 (not shown) may have additional directory entry tables and additional file-tape mapping tables (not shown) associated with the additional directories (e.g., additional filesets).

At a time associated with metadata restoration, the internal inode number allocation table for the secondary site 120 (e.g., inode bitmap 360) may be referenced. The availability of the internal inode numbers for the metadata to be restored may be determined based on the internal inode number allocation table. For example, if the metadata to be restored includes an internal inode number that has already been allocated at the restoration site, the methods, systems, and computer program products disclosed herein may update the conflicting internal inode number (e.g., in the inode for the file) prior to restoring the metadata.

As depicted in FIG. 3, internal inode number "0x01" is assigned in one of the inodes of primary inodes 130i and in one of the inodes of secondary inodes 230i. Inode bitmap 360 includes an allocation bit set to "1" for internal inode number "0x01" because it has already been allocated in secondary site 120. In response to a determination that the internal inode number is already allocated, conflicting internal inode number of the inode to be restored is updated to an available internal inode number, i.e., an internal inode number that has not been allocated at secondary site 120 (e.g., an internal inode number that has a bit set to "0" in inode bitmap 360).

For example, internal inode numbers "0x01" and "0x02" (in primary inodes 130i) are updated to available internal inode numbers "0x02" and "0x04", respectively.

An inode mapping table at secondary site (secondary inode mapping table 372), e.g., associated with the directory and files (or fileset) from the primary site 110, may be updated to include correspondence between the external and internal inode numbers associated with data to be restored.

Primary inodes 130i may be restored at secondary site 120 with the updated (and previously unallocated) internal inode numbers.

Although, as depicted in FIG. 3, the metadata associated with data generated at secondary site 120 includes internal and external inode numbers, it is contemplated that the data (not including restored data) generated at secondary site 120 may include only one type of inode number (e.g., an internal inode number), as long as secondary site 120 includes an allocation table (e.g., inode bitmap 360) to prevent conflict between internal inode numbers of backup data to be restored and pre-existing data.

Figure 4:
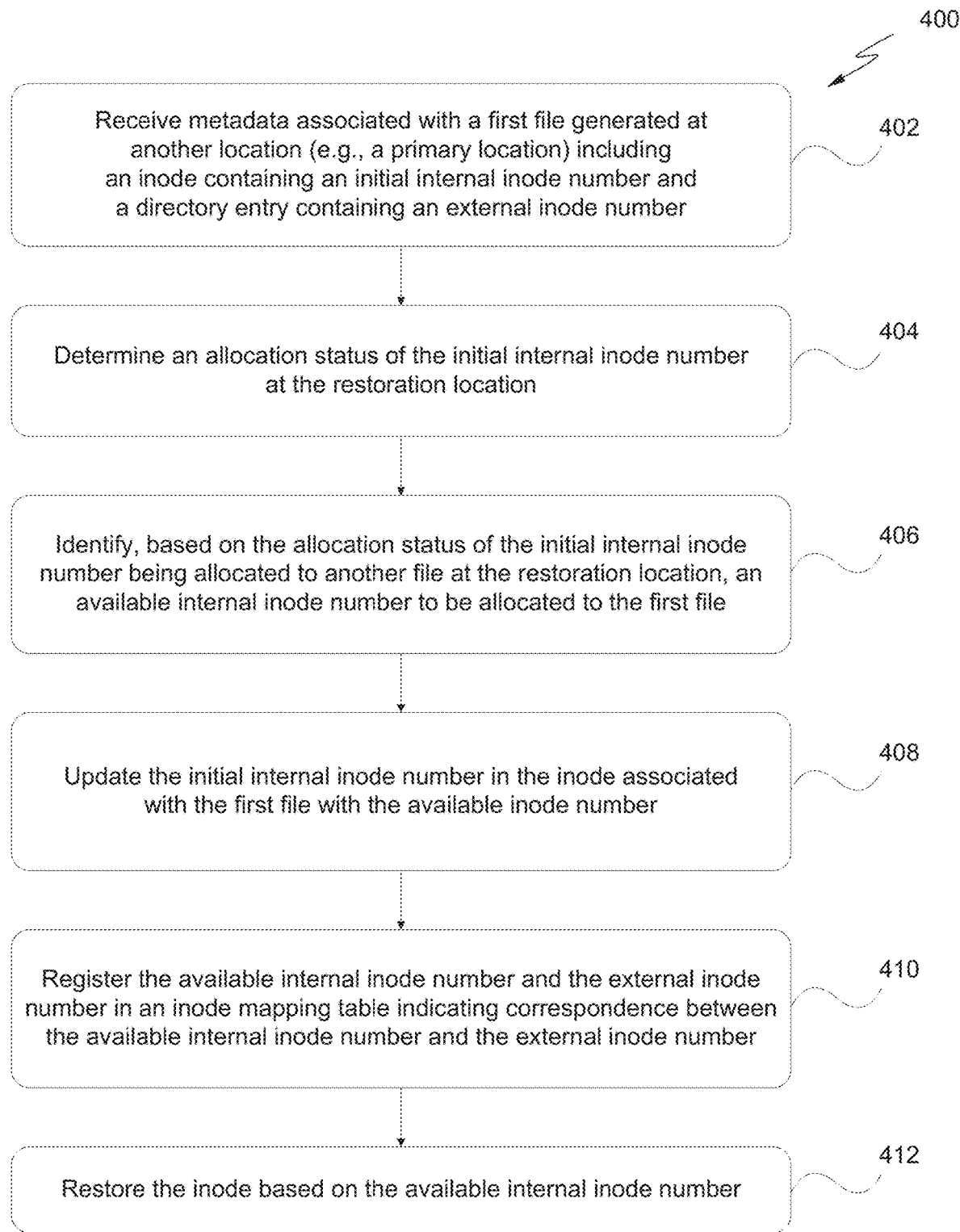
FIG. 4 is a flowchart illustrating an exemplary method of avoiding inode number conflict during metadata restoration, according to an embodiment.

FIG. 4 illustrates a first flow chart 400 depicting an exemplary method of avoiding inode number conflict during metadata restoration, according to an embodiment. At 402, at a restoration location, metadata associated with a first file generated at another location (i.e., a location different from the restoration location, such as a primary location) may be received. The metadata may include an inode containing an initial internal inode number associated with the first file and a directory entry containing an external inode number associated with the first file.

The locations (i.e., the another location and the restoration location) may be separate sites (e.g., a primary or operational site and a disaster recovery site, respectively), separate disks at the same site, or separate partitions on the same disk. It will be appreciated that the locations are not limited to the above examples and may include data storage solutions that may support the generation, management, and/or storage of internal and external inode numbers, as described herein. The locations may be managed by separate file systems. The locations may contain or be associated with one or more computers, computer systems/servers, or computing nodes.

The initial internal inode number and the external inode number may identify the first file. The first file may be part of a first fileset. The initial internal inode number may be unique to the file system containing the first file (e.g., the file system associated with the another location). The external inode number may be unique to the first fileset.

In one embodiment, the directory entry may indicate correspondence between the external inode number and a filename associated with the first file. The directory entry may be provided in a directory entry table. The directory entry table may contain a plurality of directory entries associated with a plurality of files.

At 404, an allocation status of the initial internal inode number at the restoration location may be determined. The allocation status may identify whether a particular inode number (e.g., the initial internal inode number) has been allocated to another file at the restoration location at the time of metadata restoration, e.g., of the first file. An already allocated inode number (e.g., the initial internal inode number) may not be allocated to a file to be restored at the restoration location.

In one embodiment, an internal inode allocation table indicating an allocation status of a plurality of internal inode numbers at the restoration location may be provided and determining the allocation status of the initial inode number at the restoration location may be based on the internal inode allocation table. The internal inode allocation table may be a bitmap data structure. The bitmap may indicate the state of use of the internal inode number. For example, an allocated internal inode number may have an associated bit set to "1," whereas an unallocated internal inode number may have an associated bit set to "0". The internal inode allocation table may indicate the state of use of a particular internal inode number at the time of metadata restoration (e.g., a time associated with restoring the first file).

At 406, an available internal inode number to be allocated to the first file may be identified based on the allocation status of the initial internal inode number being allocated to another file at the restoration location. In one embodiment, an available (i.e., unallocated) internal inode number may be identified from the internal inode allocation table.

At 408, the initial internal inode number in the inode associated with the first file may be updated with the available internal inode number. In one embodiment, the initial internal inode number in the inode may be overwritten with the available internal inode number.

At 410, the available internal inode number and the external inode number may be registered in an inode mapping table. The inode mapping table may indicate correspondence between the available internal inode number and the external inode number. It will be appreciated that the inode associated with first file contains an internal inode number that may be updated, for example, from an initial number to an available number depending on whether the initial number is unavailable for allocation at the restoration location. It will further be appreciated that the external inode number associated with the first file may be unchanged throughout metadata restoration.

At 412, the inode associated with the first file may be restored based on the available internal inode number. For example, the inode may be restored or written on a disk associated with the restoration location. The first file may be retrieved at a later time associated with a request to access the first file. In one embodiment, the directory entry associated with the first file may be restored.

In response to a request to access a restoration of the first file (e.g., by filename), a file system associated with the restoration location may refer to the directory entry associated with the first file and obtain the external inode number (corresponding to the filename). The file system may refer to the inode mapping table to obtain the allocated internal inode number associated with the first file (e.g., the available internal inode number), and obtain the inode associated with the first file based on the allocated internal inode number. The file system may refer to the file-tape mapping table to obtain a tape location of the file contents of the first file, and perform retrieval operations of the file contents based on the tape location of the file contents.

In one embodiment, the metadata associated with the first file may be restored at a time associated with metadata restoration and contents of the first file may be restored at a time associated with a request to access the first file. The contents of the first file may be stored on a backup medium, e.g., a tape. Metadata restoration as disclosed herein may include restoring metadata associated with backed up files and allowing the backed up files to remain on backup media until the backup files are recalled, i.e., requested or accessed.

Metadata restoration as disclosed herein may provide benefits including more efficient and quicker processing over other metadata restoration methodologies. For example, a dichotomous relationship between the inode number written in the inode and the inode number written in other entries (e.g., a directory entry, a file-tape mapping table) may avoid processes associated with updating other entries, such as randomly accessing one or more directory entries (which may be randomly situated on the backup medium or disk) or mounting a tape containing the file-tape mapping table.

Figure 5:
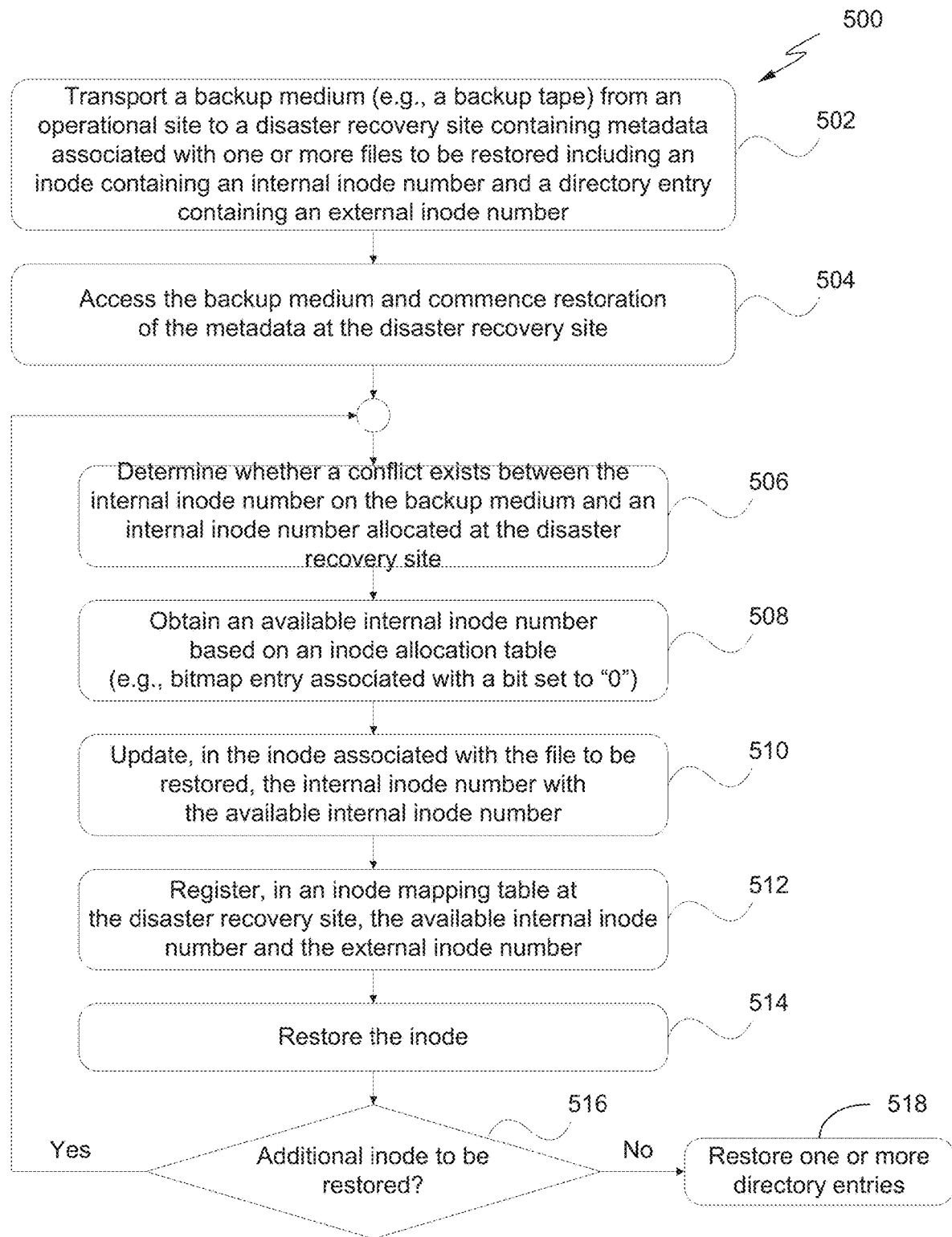
FIG. 5 is a flowchart illustrating another exemplary method of avoiding inode number conflict during metadata restoration, according to an embodiment.

FIG. 5 illustrates a second flow chart 500 depicting another exemplary method of avoiding inode number conflict during metadata restoration, according to an embodiment. At 502, a backup medium (e.g., a backup tape) may be transported from an operational site to a disaster recovery site for data restoration. The backup medium may contain metadata associated with one or more data files to be restored and the metadata may include an inode and a directory entry. The inode may contain an internal inode number and the directory entry may contain an external inode number.

At 504, the backup medium may be accessed and restoration of the metadata at the disaster recovery site may commence. Metadata restoration may include a repetitive process of restoring inodes.

At 506, a determination may be made as to whether a conflict exists between the internal inode number of a file to be restored and an internal inode number already allocated to a file at the disaster recovery site. The restoration site may have a multiplicity of internal inode numbers, and at a time associated with metadata restoration, one or more internal inode numbers may already be allocated to files at the disaster recovery site and one or more internal inode numbers may be unallocated (or available for allocation).

At 508, an available internal inode number may be obtained based on an inode allocation table. For example, the disaster recovery site may have an inode allocation table (such as a bitmap) indicating internal inode numbers available for allocation (e.g., a bitmap entry associated with an internal inode number bit set to "0").

At 510, the internal inode number in the inode associated with the file to be restored may be updated with the available internal inode number.

At 512, the available internal inode number and the external inode number may be registered in an inode mapping table at the disaster recovery site. For example, the inode mapping table may indicate a correspondence between the available internal inode number and the external inode number associated with the file (and inode) to be restored.

At 514, the inode (associated with the file to be restored) may be restored at the disaster recovery site. For example, the inode may be restored to a disk at the disaster recovery site and may be accessible and managed by a file system associated with the disaster recovery site.

At 516, a determination may be made as to whether additional inodes need to be restored. If additional inodes need to be restored, the inode restoration process (e.g., steps 506, 508, 510, 512, 514) may repeat for each additional inode to be restored. If no additional inodes need to be restored, at 518, the directory entry associated with each restored inode may be restored.

Figure 6:
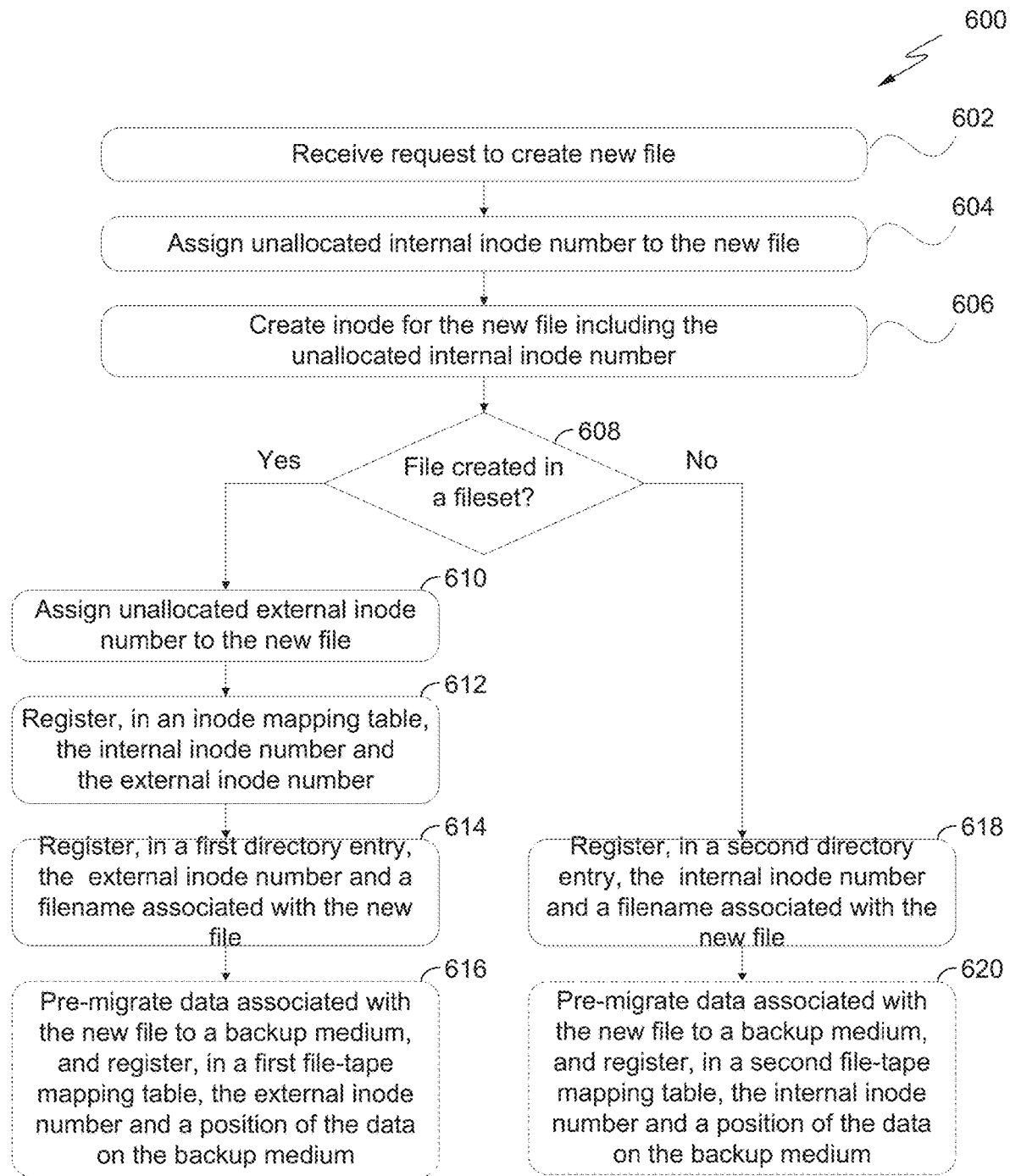
FIG. 6 is a flowchart illustrating an exemplary method of generating a data file to avoid inode number conflict during metadata restoration, according to an embodiment.

FIG. 6 illustrates a third flow chart 600 depicting an exemplary method of generating a data file to avoid inode number conflict during metadata restoration, according to an embodiment. At 602, a request to create a new file may be received, e.g., by a file system associated with a primary location.

At 604, an unallocated (available) internal inode number may be assigned to the new file, e.g., by the file system associated with the primary location. The file system may obtain (identify) an unallocated internal inode number from an internal inode number allocation table at the primary location, which may indicate an allocation status of internal inode numbers within a file system.

At 606, an inode for the new file may be created, e.g., by the file system associated with the primary location. The inode may include the unallocated internal inode number. It will be appreciated that the internal inode numbers may be unique to the file system.

At 608, a determination may be made as to whether the request to create the new file includes a request to create the new file in a fileset. If the new file is requested to be created in a fileset, at 610, an external inode number may be assigned to the new file, e.g., by the file system associated with the primary location. The file system may obtain (identify) an unallocated external inode number from an external inode number allocation table at the primary location, which may indicate an allocation status of external inode numbers within a fileset. The external inode number allocation table may be associated with the fileset within which the new file is created. It will be appreciate that the external inode numbers may be unique to a particular fileset. It will further be appreciated that file systems containing multiple filesets may have multiple external inode number allocation tables.

In one embodiment, a file system may create a new fileset and a new external inode number allocation table associated with the new fileset.

At 612, the assigned (previously unallocated) internal inode number and the assigned (previously unallocated) external inode number may be registered in an inode mapping table, which may provide correspondence between an internal inode number assigned to a file and an external inode number also assigned to the file. The inode mapping table may be associated with the fileset within which the new file is created.

At 614, the assigned (previously unallocated) external inode number and a filename associated with the new file may be registered in a first directory entry. The first directory entry may provide correspondence between an external inode number assigned to a file and a filename associated with the file. The first directory entry may be associated with the fileset within which the new file is created.

In one embodiment, a file system may create a new fileset and one or more new directory entries associated with the new fileset.

Optionally, at 616, data associated with the new file (including the contents of the new file, metadata associated with the new file, etc.) may be pre-migrated to a backup medium, and the assigned (previously unallocated) external inode number and a position of the data on the backup medium may be registered in a first file-tape mapping table. The first file-tape mapping table may be associated with the fileset within which the new file is created.

Pre-migration may include a continual backup process, which may ensure redundancy of data by providing a backup of the data on a continual and/or regular basis. It will be appreciated that the methods disclosed herein may apply to other forms of data backup and storage, as known or contemplated in the art. The backup medium may be a backup tape and the position of the data on the backup medium may, e.g., include a tape volume and a record number.

Referring back to the determination at 608, if the new file is not requested to be created in a fileset, at 618, the assigned (previously unallocated) internal inode number and a filename associated with the new file may be registered in a second directory entry. The second directory entry may provide correspondence between an internal inode number assigned to a file and a filename associated with the file. The second directory entry may be associated with the file system within which the new file is created, and may not be associated with any filesets within the file system.

Optionally, at 620, similar to the process at 616, data associated with the new file (including the contents of the new file, metadata associated with the new file, etc.) may be pre-migrated to a backup medium, and the assigned (previously unallocated) internal inode number and a position of the data on the backup medium may be registered in a second file-tape mapping table. The second file-tape mapping table may be associated with the file system within which the new file is created, and may not be associated with any filesets within the file system.

It will be appreciated that the exemplary method of generating a data file to avoid inode number conflict during metadata restoration disclosed herein (and described with reference to FIG. 6) may be practiced with or without the processes described at 616 and 620, and may be performed at a primary location and/or another location, e.g., a restoration location.

It is contemplated that the internal and/or the external inode numbers may be assigned from bidirectional list on a cache, which may allow efficient assignment of internal and/or external inode numbers without accessing a disk (associated with unallocated internal and/or external inode numbers).

It is also contemplated that the inode mapping table may be provided on a cache, which may allow efficient processing for adding an internal and/or external inode number to the inode mapping table.

Figure 7:
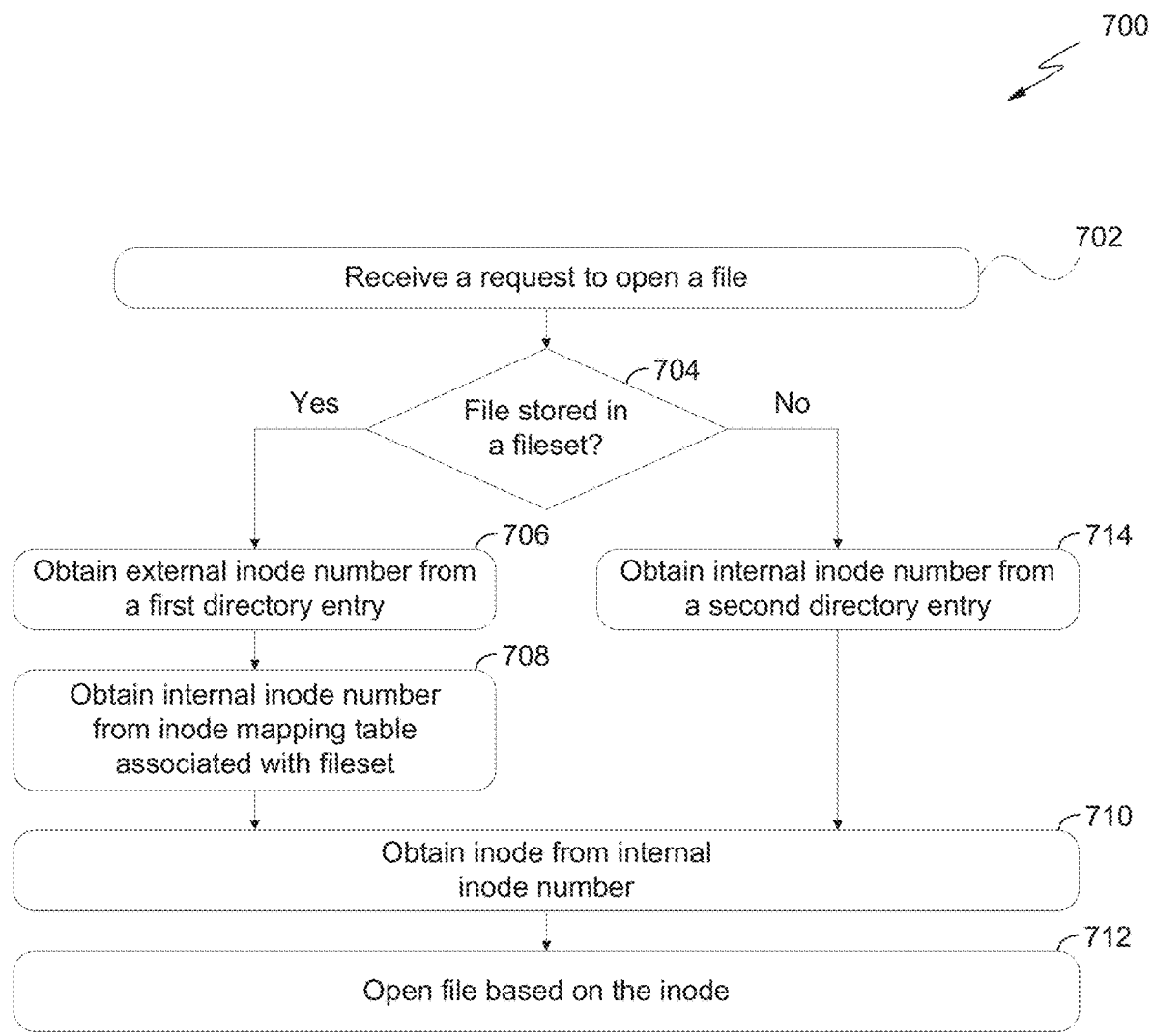
FIG. 7 is a flowchart illustrating an exemplary method of opening a data file associated with metadata that may avoid inode number conflict during metadata restoration, according to an embodiment.

FIG. 7 illustrates a fourth flow chart 700 depicting an exemplary method of opening (e.g., restoring) a data file associated with metadata that may avoid inode number conflict during metadata restoration, according to an embodiment. At 702, a request to open (access) a file may be received, e.g., by a file system associated with a restoration location. The request may contain a filename associated with the requested file.

At 704, a determination may be made as to whether the requested file is stored in a fileset. If the requested file is stored in a fileset, at 706, an external inode number assigned to the requested file may be obtained (identified) from a first directory entry, which may be associated with the fileset storing the requested file. The first directory entry may provide correspondence between an external inode number assigned to a file and a filename associated with the requested file.

At 708, an internal inode assigned to the requested file may be obtained (identified) from an inode mapping table associated with the fileset storing the requested file. The inode mapping table may provide correspondence between an internal inode number assigned to a file and an external inode number also assigned the file.

At 710, an inode for the requested file may be obtained (identified) based on the internal inode number.

At 712, the requested file may be opened (accessed) based on the inode for the requested file. If the requested file is stored on a disk at the location that the request is received, the file location within the disk, e.g., data block, may be identified and accessed by methods known in the art. Alternatively, another mapping table may include the external inode number and a corresponding disk location for the requested file. If the requested file is stored on a backup medium, e.g., a backup tape, a file-tape mapping table including the external inode number and a corresponding tape location may be used to identify and access the requested file. It will be appreciated that a tape containing the requested file may be mounted at a particular site prior to accessing the requested file on a disk at the site.

Referring back to the determination at 704, if the requested file is not stored in a fileset, at 714, an internal inode number assigned to the requested file may be obtained (identified) from a second directory entry, which may be associated with the file system within which the new file is stored, and may not be associated with any filesets within the file system. The second directory entry may provide correspondence between an internal inode number assigned to a file and a filename associated with the file.

After the internal inode number is obtained (at 714), the inode for the requested file may be obtained and the requested file may be opened, as discussed at 710 and 712.

It will be appreciated that the foregoing exemplary method of generating a data file associated with a method of avoiding inode number conflict during metadata restoration may be performed at a restoration location and/or another location, e.g., a primary location. The foregoing exemplary method may also apply to opening (accessing) files restored at a secondary location or generated at the secondary location.

It is contemplated that an internal inode number may be obtained from an external inode number (from an inode mapping table) by a computational amount $O(1)$ by forming the inode mapping table as an array of internal inode numbers and by setting the external inode number as a suffix.

The methods, computer program products, and systems disclosed herein may improve data restoration by improving the efficiency and reduce the time and resources required to restore metadata associated with the data to be restored. Metadata restoration as disclosed herein may be useful in applications and storage solutions, such as cloud storage, which may involve enormous amounts of data. One or more aspects of the embodiments disclosed herein may be provided as part of a cloud-based storage solution.

In one embodiment, the method for avoiding inode number conflict during metadata restoration (including an inode and a directory entry) at a restoration location, as disclosed herein, may include restoring the directory entry.

In one embodiment, the metadata associated with the first file further includes a file-tape mapping table indicating correspondence between the external inode number and a location on a backup medium containing data associated with the first file. In a further embodiment, the method includes receiving the backup medium.

In one embodiment, the first file is part of a first fileset and the another file is not part of the first fileset. In a further embodiment, the another file is part of another fileset. In another further embodiment, the inode mapping table is associated with the first fileset.

In one embodiment, the restoration location contains metadata associated with the another file comprising another inode and another directory entry, and the another inode contains an allocated internal inode number and the another directory entry contains another external inode number.

In one embodiment, the method repeats for each inode to be restored at the restoration location.

In one embodiment, a method for generating a data file to avoid inode number conflict during metadata restoration is provided. The method may include receiving a request to create a new file in a fileset, assigning an unallocated internal inode number to the new file, creating an inode for the new file containing the unallocated internal inode number, assigning an unallocated external inode number to the new file, registering the internal inode number and the external inode number in an inode mapping table, and registering the external inode number and a filename associated with the new file in a directory entry. The data may include metadata associated with the new file including the inode and the directory entry associated with the new file. In a further embodiment, the method may include pre-migrating data associated with the new file to a backup medium and registering the external inode number and a position of the data on the backup medium in a file-tape mapping table.

In one embodiment, a method for opening a data file associated with metadata that may avoid inode number conflict during metadata restoration is provided. The method may include receiving a request to access a file stored in a fileset, obtaining an external inode number associated with the file from a directory entry associated with the fileset, obtaining an internal inode number associated with the file from an inode mapping table associated with the fileset, obtaining an inode associated with the file based on the internal inode number, and accessing the file based on the inode.

Embodiments disclosed and contemplated herein may be implemented and/or performed by any type of computer, known or contemplated, regardless of the platform being suitable for storing and/or executing program code.

Figure 8:
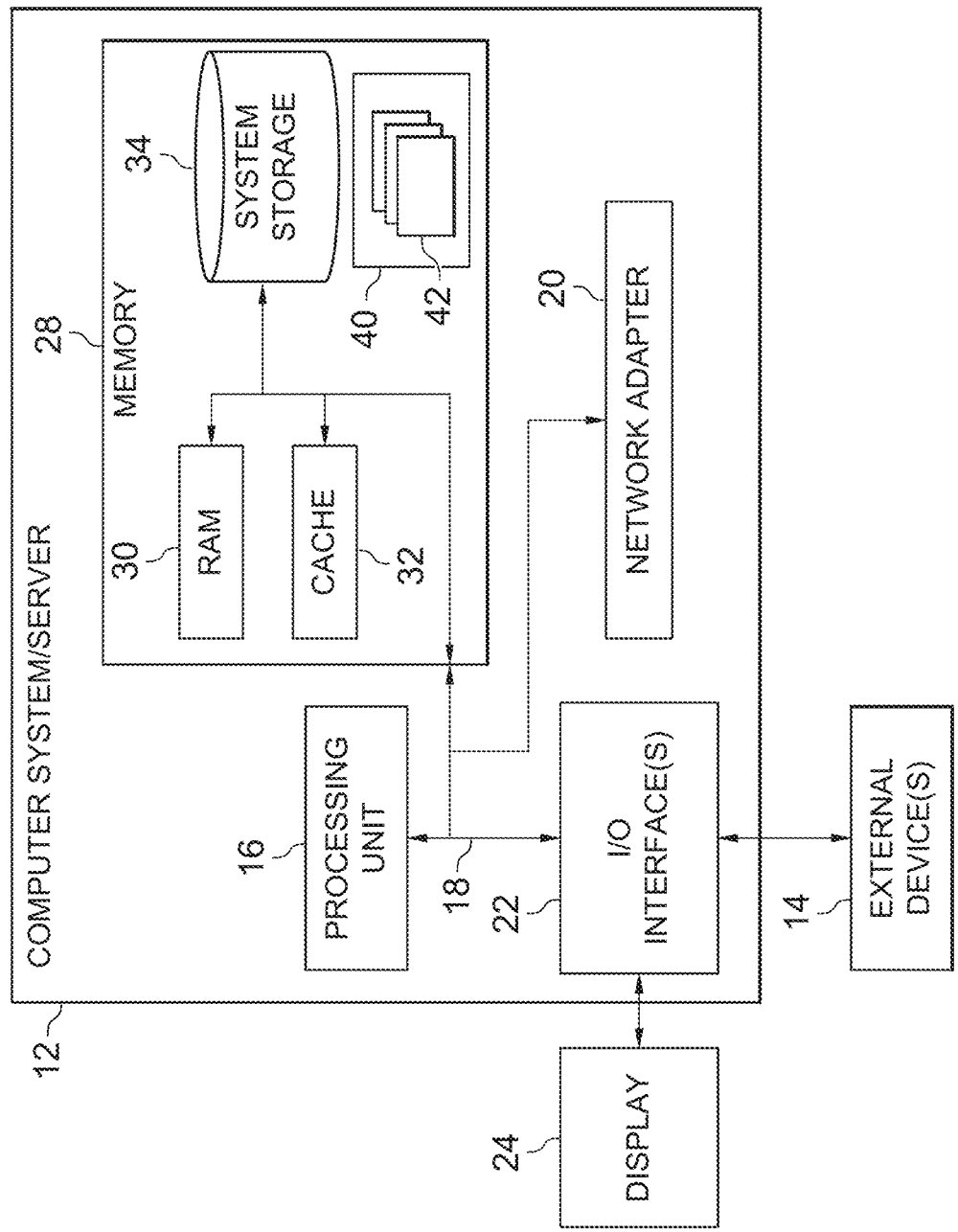
FIG. 8 is a block diagram illustrating a computing node, according to an aspect of the invention.

FIG. 8 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
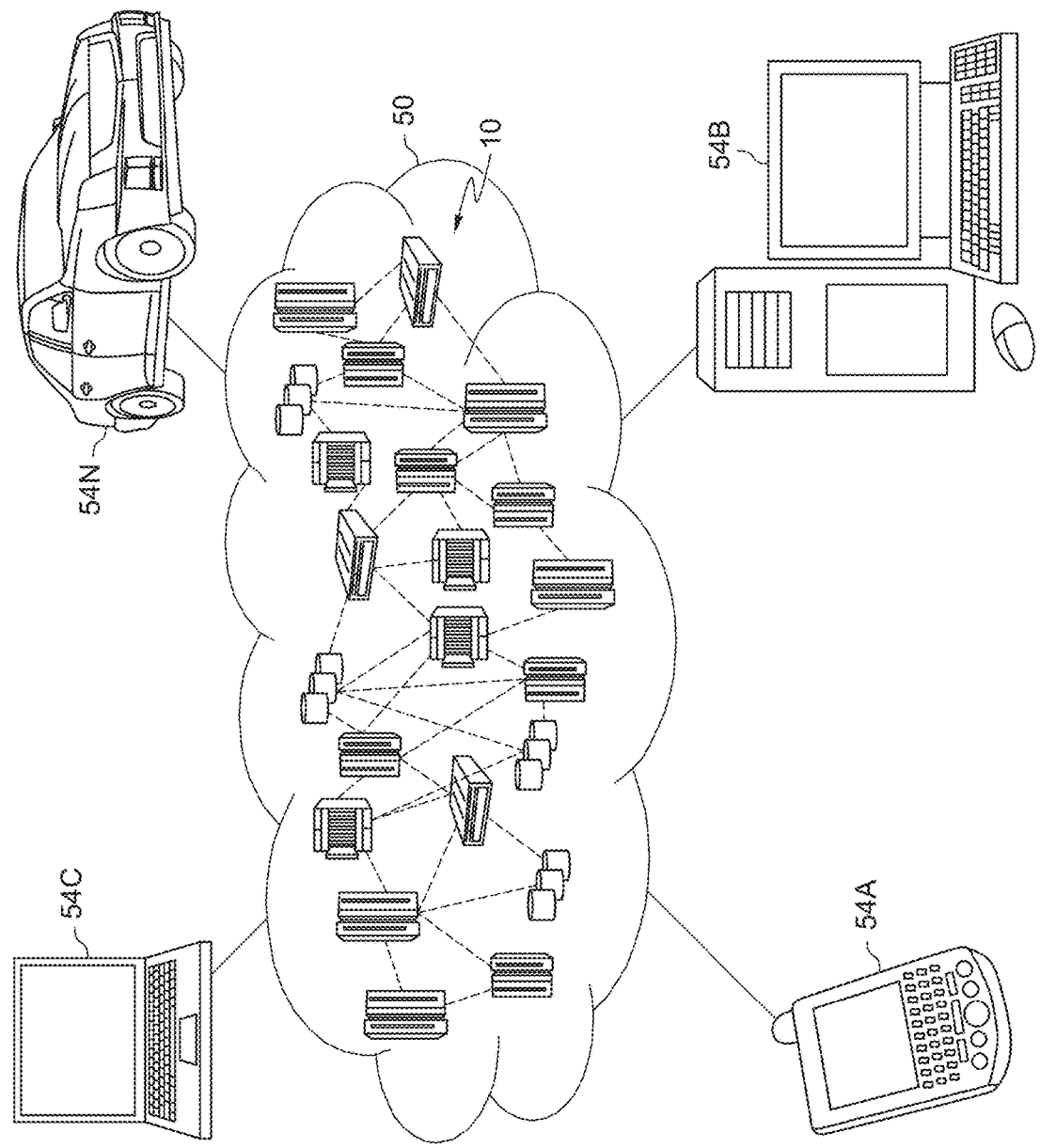
FIG. 9 depicts a cloud computing environment according to an embodiment of the present invention.

Referring now to FIG. 9, illustrative cloud computing environment 50 is depicted. As shown, cloud computing environment 50 comprises one or more (cloud) computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
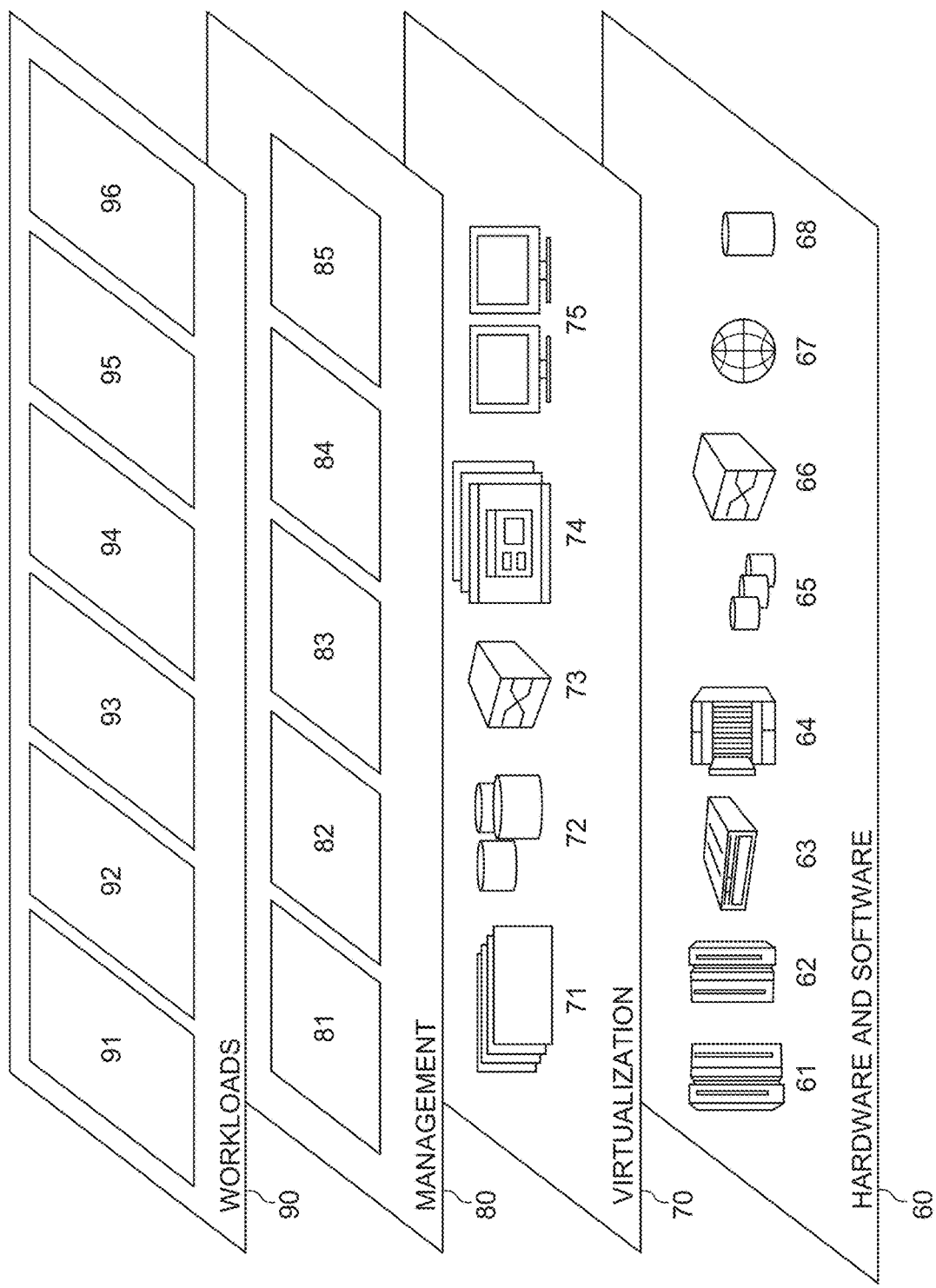
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Methods for avoiding inode number conflict during metadata restoration may be performed in a cloud environment, e.g., in the hardware and software layer 60 and/or the virtualization layer 70.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for avoiding Mode number conflict during metadata restoration at a restoration location, the method comprising:
   receiving metadata associated with a first file generated at another location, wherein the metadata comprises an Mode containing an initial internal Mode number and a directory entry containing an external Mode number;
   determining an allocation status of the initial internal Mode number at the restoration location;
   identifying, based on the allocation status of the initial internal Mode number being allocated to another file at the restoration location, an available internal Mode number to be allocated to the first file;
   updating the initial internal Mode number in the Mode associated with the first file with the available internal Mode number; and
   restoring the Mode based on the available internal Mode number.

2. The method according to claim 1, further comprising: restoring the directory entry.

3. The method according to claim 1, wherein the metadata associated with the first file further comprises a file-tape mapping table indicating correspondence between the external Mode number and a location on a backup medium containing data associated with the first file.

4. The method according to claim 3, further comprising: receiving the backup medium.

5. The method according to claim 1, wherein the directory entry indicates correspondence between the external Mode number and a filename associated with the first file.

6. The method according to claim 1, wherein the directory entry is provided in a directory entry table.

7. The method according to claim 1, further comprising:
providing an internal Mode allocation table indicating an allocation status of a plurality of internal Mode numbers at the restoration location; and
wherein determining the allocation status of the initial internal Mode number at the restoration location is based on the internal Mode allocation table.

8. The method according to claim 7, wherein the internal Mode allocation table is a bitmap data structure.

9. The method according to claim 1, wherein the first file is part of a first fileset and the another file is not part of the first fileset.

10. The method according to claim 9, wherein the another file is part of another fileset.

11. The method according to claim 9, wherein the Mode mapping table is associated with the first fileset.

12. The method according to claim 1, wherein the restoration location contains metadata associated with the another file comprising another Mode and another directory entry, wherein the another Mode contains an allocated internal Mode number and the another directory entry contains another external Mode number.

13. The method according to claim 1, wherein the method repeats for each Mode to be restored at the restoration location.

14. A computer program product for avoiding Mode number conflict during metadata restoration at a restoration location, the computer program product comprising at least one computer readable non-transitory storage medium having computer readable program instructions thereon for execution by a processor, the computer readable program instructions comprising program instructions for:
receiving metadata associated with a first file generated at another location, wherein the metadata comprises an Mode containing an initial internal Mode number and a directory entry containing an external Mode number;
providing an Mode allocation table indicating an allocation status of a plurality of internal Mode numbers at the restoration location;
determining, based on the Mode allocation table, an allocation status of the initial internal Mode number;
identifying, based on the allocation status of the initial internal Mode number being allocated to another file at the restoration location, an available internal Mode number to be allocated to the first file;
updating the initial internal Mode number in the Mode associated with the first file with the available internal Mode number; and
restoring the Mode based on the available internal Mode number.

15. The computer program product according to claim 14, further comprising:
restoring the directory entry.

16. The computer program product according to claim 14, wherein the first file is part of a first fileset and the another file is not part of the first fileset.

17. The computer program product according to claim 16, wherein the Mode mapping table is associated with the first fileset.

18. A computer system for avoiding Mode number conflict during metadata restoration at a restoration location, the computer system comprising:
at least one processing unit;
at least one computer readable memory;
at least one computer readable tangible, non-transitory storage medium; and program instructions stored on the at least one computer readable tangible, non-transitory storage medium for execution by the at least one processing unit via the at least one computer readable memory, wherein the program instructions comprise program instructions for:
receiving metadata associated with a first file generated at another location, wherein the metadata comprises an Mode containing an initial internal Mode number and a directory entry containing an external Mode number;
providing an Mode allocation table indicating an allocation status of a plurality of internal Mode numbers at the restoration location;
determining, based on the Mode allocation table, an allocation status of the initial internal Mode number;
identifying, based on the allocation status of the initial internal Mode number being allocated to another file at the restoration location, an available internal Mode number to be allocated to the first file;
updating the initial internal Mode number in the Mode associated with the first file with the available internal Mode number; and
restoring the Mode based on the available internal Mode number.

19. The computer system according to claim 18, further comprising:
restoring the directory entry.

20. The computer system according to claim 18, wherein the first file is part of a first fileset and the another file is not part of the first fileset.

* * * * *